(12) United States Patent
Kool et al.

(10) Patent No.: US 7,052,737 B2
(45) Date of Patent: May 30, 2006

(54) FORMING A MONITORING DEPOSIT ON A SUBSTRATE

(75) Inventors: Lawrence B. Kool, Clifton Park, NY (US); James A. Ruud, Delmar, NY (US); John W. Devitt, Mason, OH (US)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 10/294,727

(22) Filed: Nov. 15, 2002

(65) Prior Publication Data

US 2004/0096314 A1 May 20, 2004

(51) Int. Cl.
    *B05D 5/00* (2006.01)

(52) U.S. Cl. .................. 427/256; 427/261; 427/372.2

(58) Field of Classification Search .............. 427/157, 427/159, 256, 258, 261, 287, 397.7, 401, 427/419.1, 419.2, 419.3, 445
See application file for complete search history.

(56) References Cited

U.S. PATENT DOCUMENTS

| 4,327,120 A | 4/1982 | Siemers et al. |
| 4,327,155 A | 4/1982 | Hanneman |
| 5,865,598 A * | 2/1999 | Twerdochlib ............... 415/118 |
| 6,062,811 A | 5/2000 | Zombo et al. |
| 6,200,088 B1 | 3/2001 | Zombo et al. |
| 6,644,917 B1 * | 11/2003 | Zhao et al. ................. 415/200 |

FOREIGN PATENT DOCUMENTS

| DE | 36 38 266 A1 * | 5/1988 |
| DE | 37 37 502 A1 * | 5/1988 |
| WO | WO 00/06796 | 2/2000 |
| WO | WO 00/06796 A1 * | 2/2000 |

OTHER PUBLICATIONS

English language translation of DE 37 37 502 A1, provided by USPTO Translations Branch.*

* cited by examiner

*Primary Examiner*—Shrive P. Beck
*Assistant Examiner*—William Phillip Fletcher, III
(74) *Attorney, Agent, or Firm*—Ernest G. Cusick; Philip D. Freedman

(57) ABSTRACT

A method for forming a monitoring deposit on a substrate comprises determining a temperature range to subject the substrate to provide a high temperature of operation up to less than a critical substrate deterioration temperature; selecting a binder to monitor temperature by emitting an indicator within the determined temperature range; combining the indicator and the binder; and applying the combined indicator and binder to the substrate to form the monitoring deposit. An article comprises a substrate; and a combined indicator and binder applied into the substrate, wherein the binder emits the indicator within a temperature range determined to subject the substrate to high temperature operation up to less than a critical substrate deterioration temperature. Also, a method of monitoring a gas turbine system comprise selecting a binder to monitor temperature by emitting an indicator within a temperature range determined to permit subjecting a substrate in the system to high temperature operation up to less than a critical turbine substrate deterioration temperature; combining the indicator and the binder; and applying the combined indicator and binder to the substrate to form the monitoring deposit. A system for monitoring a gas turbine engine comprises a substrate; and a combined indicator and binder applied onto the substrate, wherein the binder emits the indicator within a temperature range determined to permit subjecting the substrate to high temperature operation up to less than a critical substrate deterioration temperature.

22 Claims, 6 Drawing Sheets

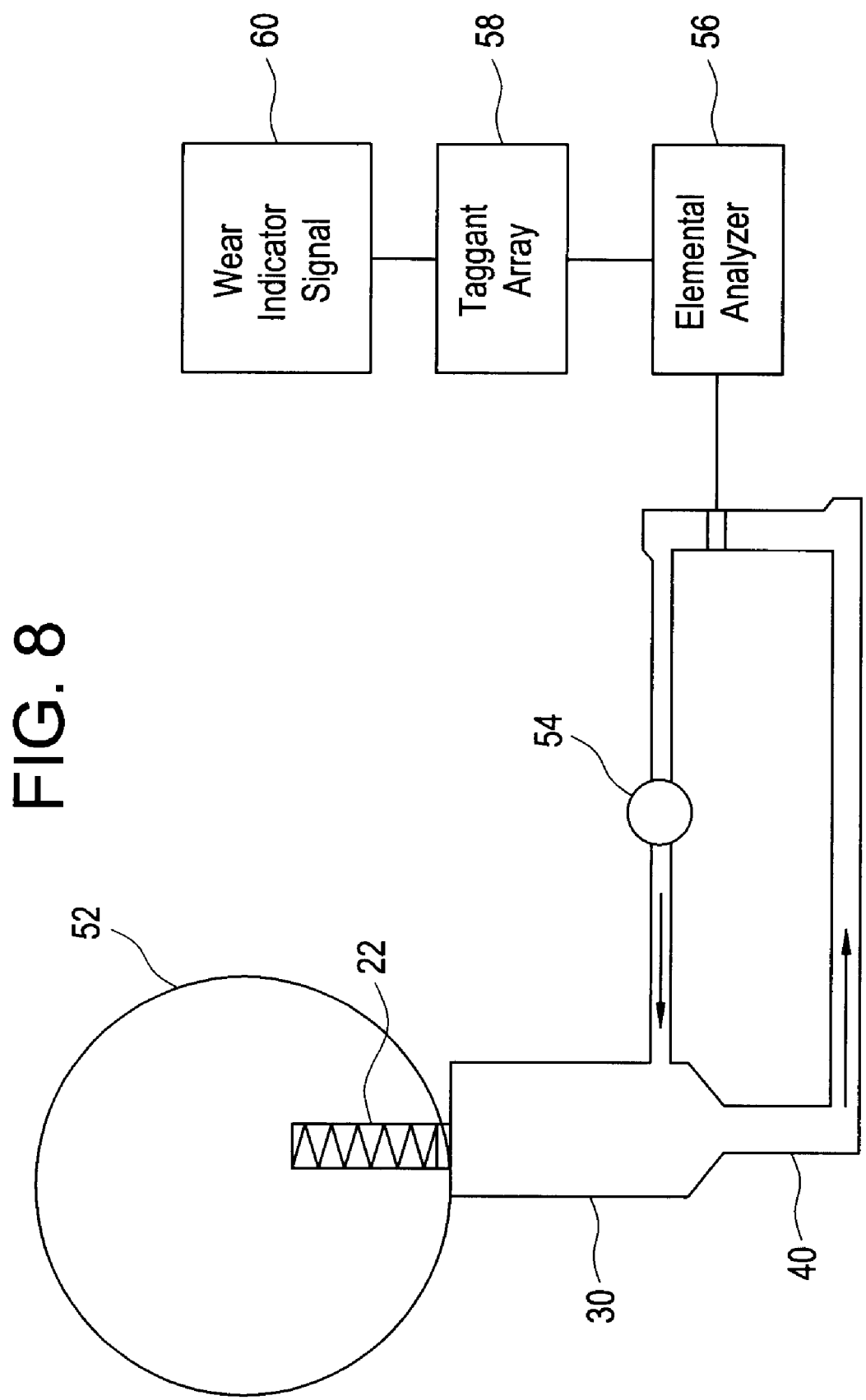

FORMING A MONITORING DEPOSIT ON A SUBSTRATE

BACKGROUND OF THE INVENTION

The invention relates to a method, article and system for monitoring a combustion system with a selected binder. More particularly, the invention is directed to an indicator in a selected binder.

A gas turbine engine includes in serial flow communication, one or more compressors followed in turn by combustors and high and low pressure turbines disposed about a longitudinal axial centerline within an annular outer casing. During operation, the compressors are driven by the turbine to compress air, which is mixed with fuel and ignited in the combustors to generate hot combustion gases. The combustion gases flow downstream through the high and low pressure turbines to extract energy to drive the compressors to produce output power either as shaft power or thrust.

The operating environment within a gas turbine engine is both thermally and chemically hostile and deleterious to certain engine components. If the components are located in certain sections of the engine such as the combustors, high pressure turbine or augmentor, they cannot withstand long service exposure. Typically the surfaces of these components are coated with a protective system, such as a thermal barrier coating system. A thermal barrier coating system includes an environmentally-resistant bond coating and a thermal barrier coating (TBC) of a ceramic material applied as a topcoat over a bond coat. Bond coats are typically formed of an oxidation-resistant alloy such as MCrAlY where M is iron, cobalt and/or nickel, or a diffusion aluminide or platinum aluminide. At high temperature, these bond coats form an oxide layer or scale that chemically bonds the ceramic layer to the underlying component.

Maximum power output of a gas turbine is achieved by heating the gas flowing through the combustion section to as high a temperature as is feasible. However, the heated gas also heats the various turbine components as it flows through the turbine. These components may be critical components that have a direct impact on the operation and efficiency of the turbine. With time, continued flow of excessively high temperature air wears down the component protective TBC layer.

Additionally, unnecessarily high turbine engine combustion temperatures can compromise fuel efficiency and increase emission pollution. For example, in a gas turbine designed to emit nine nitrogen oxide ($NO_x$) particles per million (ppm), an increase from 2730° F. (1499° C.) to 2740° F. (1504° C.) reduces turbine efficiency by about two percent and increases $NO_x$ emissions by about two ppm. On an annual basis, this can amount to millions of dollars of lost revenue and to several tons increase in $NO_x$ emission.

So called "smart materials" have been proposed to monitor and detect on-line wear due to high temperature operation and other effects of operation in a corrosive environment. A smart material senses a change in an environment, and then using a feedback system, makes a useful response. Hanneman, U.S. Pat. No. 4,327,155 and Siemers et al., U.S. Pat. No. 4,327,120 provide examples of smart materials. Hanneman teaches a substrate that has a protective metallic or ceramic coating. The substrate is subject to a high degree of surface erosion that eventually wears away the protective coating. The protective coating can be periodically renewed or replaced by plasma or flame spraying with a powdered metal or a powdered metal oxide blend. Hanneman proposes a smart coating that includes a UV sensitive phosphor. The UV sensitive material-containing coating emits UV sensitive material as it wears. Monitoring the emission of UV sensitive material can indicate when additional plasma or flame spraying of the metal substrate with powdered metal or powdered metal oxide should be undertaken. Siemers et al. teaches that the particulate size of the phosphor component of the UV sensitive indicating material should be sized according to an Energy of Melting formula.

The Hanneman and Siemers et al. materials can be used in systems to estimate parts life. Typically, life monitoring takes the form of detecting UV sensitive material and relating a quantity of detected material over a period of time to a data base that includes relationships of material over time with coating wear. However, detected material over time and wear relationship data is not available for new systems or, for that matter, for most old systems. Additionally, oftentimes known indicators are applied to a component in a non-uniform manner. In this case, detected indicators do not accurately reflect wear or other operational effects.

Some coating life monitoring methods are based on average effects of stress and temperature profiles of all the parts. These methods are unable to focus on individual parts because they do not take into account the exposure circumstances of a particular part or section of a part. A particular part or section of a part may uniquely encounter wear or damage caused by foreign objects, varying operating conditions from site to site and occasional turbine over-firing. Such circumstances can uniquely influence coating and part life.

Hence, it is desirable to monitor a particular part that may be subjected to a local heating that is not represented by an overall system temperature. There is a need for a method, article and system to sense and monitor UV sensitive material emission from a coating to provide accurate information and particular location information to determine wear, maintenance scheduling and to reduce noxious emissions.

BRIEF DESCRIPTION OF THE INVENTION

The present invention provides a method, article and system to sense and monitor indicator emissions from a coating to provide accurate, particular location information to determine wear, maintenance scheduling and to reduce noxious emissions. The invention provides a method for forming a monitoring deposit on a substrate, comprising determining a temperature range to subject the substrate to provide a high temperature of operation up to less than a critical substrate deterioration temperature; selecting a binder to monitor temperature by emitting an indicator within the determined temperature range; combining the indicator and the binder; and applying the combined indicator and binder to the substrate to form the monitoring deposit.

Also, the invention relates to an article, comprising a substrate; and a combined indicator and binder applied into the substrate, wherein the binder emits the indicator within a temperature range determined to subject the substrate to high temperature operation up to less than a critical substrate deterioration temperature.

In another embodiment, the invention relates to a method of monitoring a gas turbine system comprising selecting a binder to monitor temperature by emitting an indicator within a temperature range determined to permit subjecting a substrate in the system to high temperature operation up to less than a critical turbine substrate deterioration temperature; combining the indicator and the binder; and applying the combined indicator and binder to the substrate to form the monitoring deposit.

In yet another embodiment, the invention is a system for monitoring a gas turbine engine comprising a substrate; and a combined indicator and binder applied onto the substrate, wherein the binder emits the indicator within a temperature range determined to permit subjecting the substrate to high temperature operation up to less than a critical substrate deterioration temperature.

BRIEF DESCRIPTION OF THE DRAWING

FIG. 8 is a schematic block diagram of system for collecting and detecting indicators.

DETAILED DESCRIPTION OF THE INVENTION

The term "luminescence" means a light emission that cannot be attributed merely to the temperature of an emitting body, but results from such causes as chemical reactions at ordinary temperatures, electron bombardment, electromagnetic radiation or electric fields. A "phosphor" is a substance that converts part of an absorbed primary energy into emitted luminescent radiation. In this application, the term "indicator" includes a phosphor compound that exhibits fluorescence and non-luminescent materials that can be detected in a gas stream after release from a binder.

The invention provides a particular binder and indicator combination monitoring deposit to a part that permits indicator release within a critical temperature range that is high enough to assure efficient turbine engine operation while avoiding excessively high temperatures that will deteriorate engine parts. The binder/indicator deposit comprises a binder that melts within the critical temperature range to release the indicator for detection.

An embodiment of the invention relates to an "on-line" assessment method in which a gas turbine part is tagged with a monitoring deposit that includes a selected customized binder containing a specific indicator. The binder is selected according to a critical temperature of the part on which the binder/indicator composition is applied. The indicator is selected to specifically and uniquely identify its applied part as a source part to a down stream detector. At the critical temperature, the binder melts to release the unique indicator. When detected downstream, the indicator identifies the source part and its degree of deterioration. This information provides improved "on-line" knowledge of a coated part's condition and determines a replacement and repair strategy to improve machine operational up-time. "Online" means that the assessment is determined without interrupting the operation of the turbine. A preferred embodiment of invention includes smart binder/indicator compositions that serve as online indicators of the degree of wear and damage of gas turbine section parts.

Features of the invention will become apparent from the drawings and following detailed discussion, which by way of example without limitation describe preferred embodiments of the invention.

Figure 5:
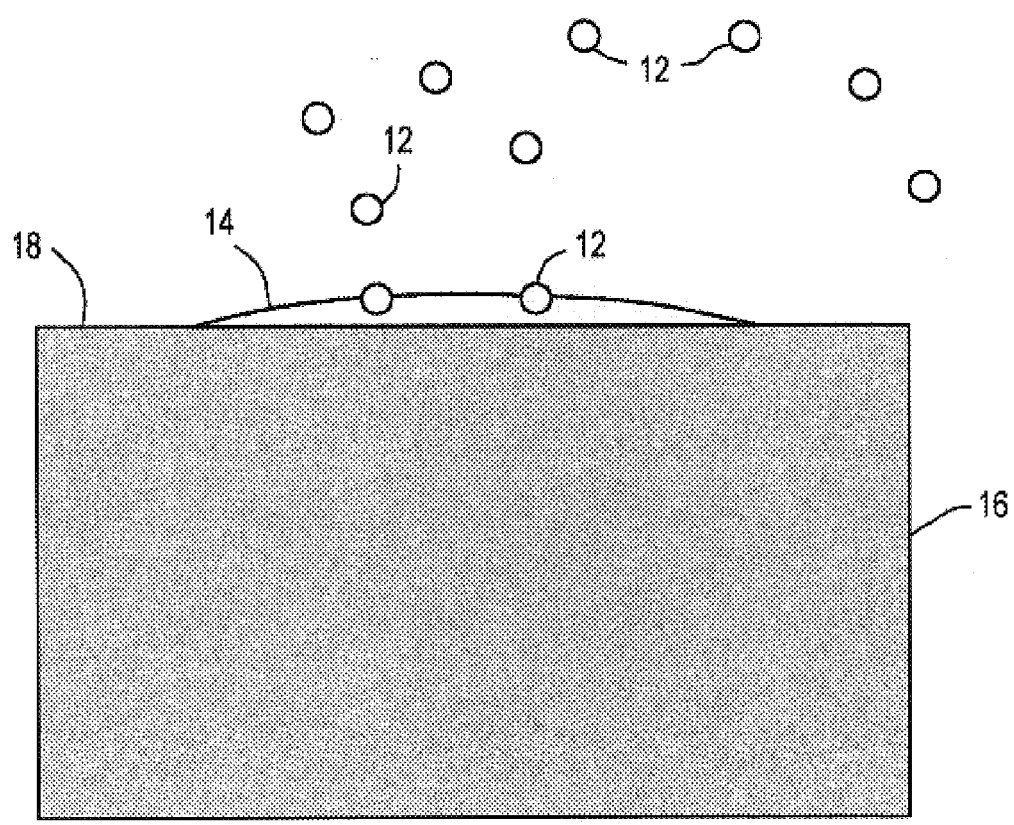
FIG. 5 is a schematic representation of an indicator releasing from the binder of a combination monitoring deposit.

FIGS. 1 to 4 of the figures are schematic representations of indicator and binder combination monitoring deposits applied onto a substrate and FIG. 5 is a schematic representation of an indicator releasing from the binder of a combination monitoring deposit. In these figures, binder/indicator composition 10 includes indicator 12 combined into binder 14 and applied onto substrate 16.

Figure 1:
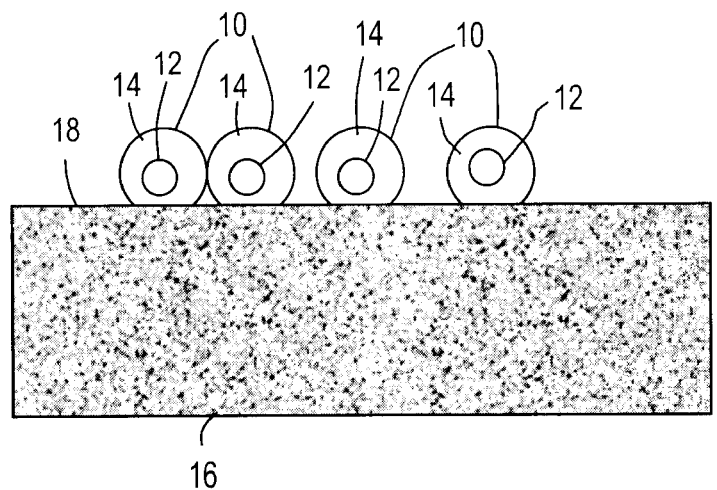
FIGS. 1 to 4 are schematic representations of indicator and binder combination monitoring deposits applied onto a substrate.
Figure 2:
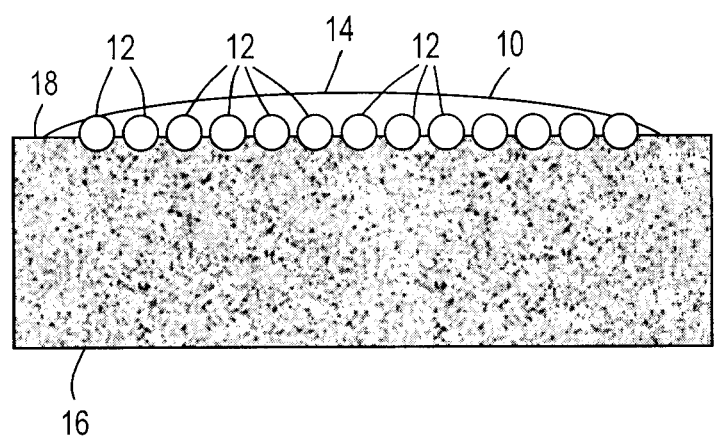
Figure 3:
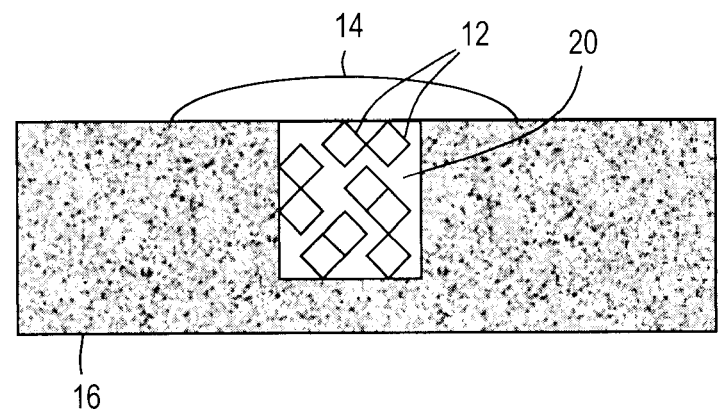
Figure 4:
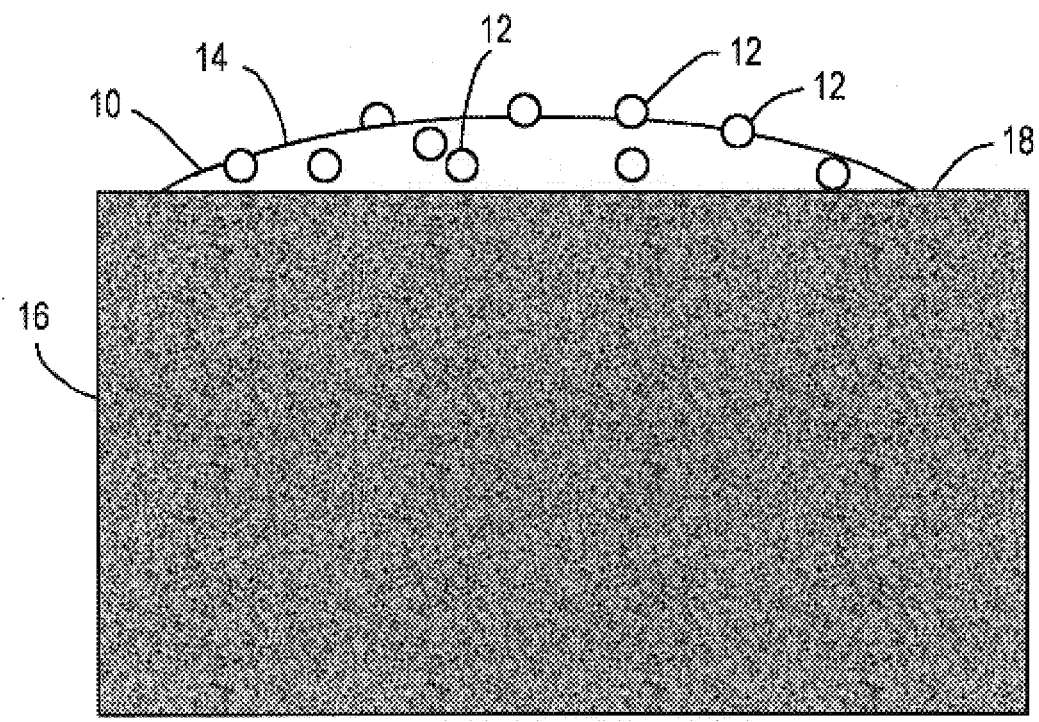

The binder/indicator composition of the invention can be formed and applied to a substrate in a variety of ways. FIG. 1 shows a composition 10 in the form of indicator 12 particles that have been pre-coated with binder 14 and then applied to an upper surface 18 of the substrate 16. FIG. 2 shows a composition 10 that has been formed by first applying indicator 12 particles to an upper surface 18 of the substrate 16 followed by application of binder 14 to encompass the indicator 12 particles. In FIG. 3, a well 20 is first formed into the substrate 16. Indicator 12 particles are deposited into the well 20, which is subsequently capped by the binder 14.

Indicator 12 can be either a chemical compound or element. As shown, the indicator 12 is doped into the binder 14 or applied to a substrate 16 and covered by the binder 14. The indicator is detected upon release from the binder 14 when the binder begins to melt when a critical operating temperature is reached. The indicator is identified to indicate that a particular part has reached the critical temperature. In a preferred embodiment, hereinafter described in detail, different binder/indicator compositions are applied to different sets of parts of a gas turbine. Released indicators are in an exhaust stream, indicating wear or damage to particular turbine parts.

The indicator is selected to be stable and relatively inactive with respect to diffusion at the high turbine operating temperatures involved, and to not have a deleterious effect on coating and turbine performance. The indicator is selected to retain fluorescence upon exposure to high temperatures for extended periods. The indicator will not react with or dissolve in the binder material. It is easily detected by a fluorescent particle sampling technique. Preferably, the indicator is reliably detectable in small concentrations. Suitable fluorescent indicators are available commercially. For example, a variety of inorganic fluorescent indicators catalogue # SFP-0010, (white), #SFP-0013 (green) and SFP-0018 (red) are available from Spectra Systems Corporation, 321 South Main Street, Providence, R.I. 02903.

A variety of binders is suitable in the invention. The binder must not chemically react or corrode the substrate material. The binder must not degrade physically during operation. The binder must melt at a characteristic temperature that is of interest and in the process, release the fluorescent particles into the turbine exhaust. The binder must be non-hazardous and non-toxic. The binder must not be prohibitively expensive. The binder must not react with, dissolve or degrade the fluorescent particles.

TABLE 1 provides a list of binders and their associated melting points.

TABLE 1

| Binder | m.p. °C. | m.p. °F. | Binder | m.p. °C. | m.p. °F. | Binder | m.p. °C. | m.p. °F. |
|---|---|---|---|---|---|---|---|---|
| $CeCl_3$ | 848 | 1558.4 | $K_2Ca(SO_4)_2$ | 1004 | 1839.2 | $PbSO_4$ | 1114 | 2037.2 |
| $BaBr_2$ | 880 | 1616 | $YI_3$ | 1004 | 1839.2 | CdTe | 1121 | 2049.8 |
| $K_2CO_3$ | 891 | 1635.8 | $Cs_2SO_4$ | 1010 | 1850 | $KAlSi_3O_8$ | 1140 | 2084 |
| $LuCl_3$ | 905 | 1661 | $Pb_2(PO_4)_2$ | 1014 | 1857.2 | $HoF_3$ | 1143 | 2089.4 |
| La | 918 | 1684.4 | $ErI_3$ | 1020 | 1868 | $FeSiO_3$ | 1146 | 2094.8 |
| $GdI_3$ | 926 | 1698.8 | Ac | 1050 | 1922 | $CrCl_3$ | 1150 | 2102 |
| $Li_2S$ | 950 | 1742 | $In_2S_3$ | 1050 | 1922 | $PbSO_4$ | 1170 | 2138 |
| $KBO_2$ | 950 | 1742 | $LuI_3$ | 1050 | 1922 | $FeS_2$ | 1171 | 2139.8 |
| $DyI_3$ | 955 | 1751 | $PbMoO_4$ | 1060 | 1940 | $LuF_3$ | 1182 | 2159.6 |
| GaS | 965 | 1769 | Sm | 1074 | 1965.2 | $Mg3(PO_4)_2$ | 1184 | 2163.2 |
| $Ce_2(MO_4)_3$ | 973 | 1783.4 | Cu | 1083 | 1981.4 | FeS | 1193 | 2179.4 |
| $Ca(PO_3)_2$ | 975 | 1787 | CuSCN | 1084 | 1983.2 | $Ca_3N_2$ | 1195 | 2183 |
| $K_2SiO_3$ | 976 | 1788.8 | $GeO_2$ | 1086 | 1986.8 | BaS | 1200 | 2192 |
| $HoI_3$ | 989 | 1812.2 | $Mn_3P_2$ | 1095 | 2003 | $Cu_2O$ | 1235 | 2255 |
| NaF | 993 | 1819.4 | $Al_2S_3$ | 1100 | 2012 | $CaOFe_2O_3$ | 1250 | 2282 |
| Am | 994 | 1821.2 | $CrF_2$ | 1100 | 2012 | | | |
| $CdSO_4$ | 1000 | 1832 | $Fe_3P$ | 1100 | 2012 | | | |
| $Na_2OAl_2O_34SiO_3$ | 1000 | 1832 | $Mg_2Si$ | 1102 | 2015.6 | | | |

A eutectic binder mixture can be used as the binder in another embodiment of the invention. For example, the eutectic LiCl with 40 mol % KCl melts at 350° C. A LiCl/NaCl mixture melts between 552° C. and 819° C., depending on the ratio of the two components. A eutectic permits a combination to be customized for application to numerous parts sections wherein each is sensitive to a different temperature effect. An additional advantage of the eutectic binder is that variables related to chemical reactivity, physical erosion, corrosion etc., are roughly equivalent while the characteristic melting point can be varied for use in connection with a variety of turbine engine parts.

As FIGS. 1 to 4 illustrate, the binder/indicator composition 10 can be applied in a number of different ways. In some cases, the binder and indicator can be blended together, then melted and applied as spots at various locations on an airfoil. In another embodiment, a small well is drilled into the surface of the airfoil, the well filled with an indicator such as fluorescent particles and a molten binder is applied to seal the well at the airfoil surface. Combinations of these techniques can be used.

Suitable indicator materials include yttrium oxide doped with +3 europium, $Ce_{1-X-Y}La_XTb_YMgAl_{11}O_{19}$, where $0<X<0.2$ and $0.2<Y<0.4$, cerium magnesium aluminate doped with +3 terbium, or yttrium oxide doped with +3 europium, especially $Ce_{0.7}Tb_{0.3}MgAl_{11}O_{19}$ (CAT) and the like. Additional phosphors that can be used as indicators include $Zn_2SiO_4$ doped with Mn or As, $La_2O_2S$ doped with Tb, $Y_2O_2S$ doped with Eu, $CaWO_4$, and $Gd_2O_2S$ doped with Tb, $LaPO_4$ doped with Ce and Tb, $LaPO_4$ with Eu. In addition to the luminescent indicators, indicators may be selected from radioactive isotopes or certain metal indicators such as Cr or Co.

Some exemplary binder/indicator combinations include the binders of TABLE 1 and inorganic fluorescent indicators. Preferred binders include $Na_2O\,Al_2O_34SiO_3$, $K_2SiO_3$ and $K_2Ca(SO_4)_2$ in combination with organo-metallic indicators such as SFP-0010 (white) and SFP-0013 (green) and SFP-0018 (red) available from Spectra Systems Corporation, 321 South Main Street, Providence, R.I. 02903. A europium chelate indicator such as SFP-0008 (red) is a preferred indicator. The indicator can be present in the binder/indicator combination in any proportion so long as integrity of the composition is maintained until a critical temperature is reached at which the binder melts to release the indicator. Broadly, the indicator can be present in percent by weight of the composition in a range of 1% to 99%, desirably 25% to 95% and preferably 80% to 90%.

The indicator and binder combination can be applied to any substrate in need of temperature monitoring in a deleterious operating environment. Preferably, the substrate is a part of a gas turbine that is prone to wear or damage. The turbine parts include combustors, transition pieces and high pressure turbine airfoils. The substrate can be another turbine engine part as well, such as a first stage high pressure turbine blade. Coatings of the preferred embodiments of the invention may be applied to the entire surface of these parts, or alternatively, to a portion of these parts. Preferably, the indicators are doped into layers or interfaces of coatings that are present in turbine parts that are subject to wear and damage, erosion, oxidation, and corrosion. A preferred substrate is a coating for insulating a gas turbine part. One such coating is a ceramic insulating layer, referred to as a thermal barrier coating (TBC). The heat-diffusible indicator can be applied to any substrate subject to exposure to a deleterious thermal environment. Metal substrates, such as steel, for example valve seats, turbine buckets, turbine blades, vanes, combustor liners, transition pieces, nozzles, reaction vessels, pressure vessels, boilers and various other surfaces are among the substrates that can be monitored in accordance with the invention for differential erosion or corrosion. Suitable ceramic substrates include alumina shafts that are subject to differential wear or differential erosion or corrosion.

Figure 6:
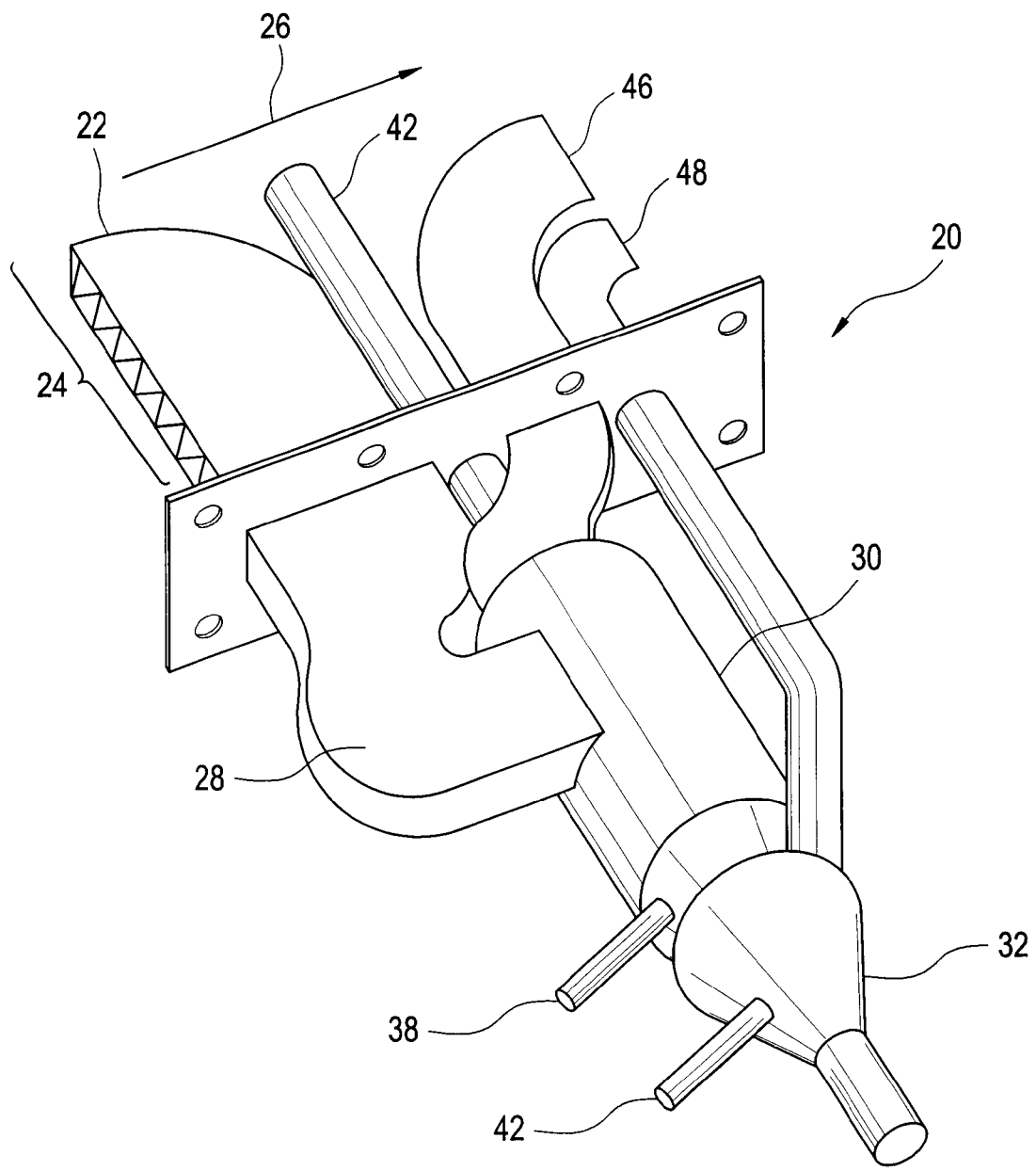
FIG. 6 is a schematic perspective view of an embodiment of the invention for collecting particles from an exhaust stream.
Figure 7:
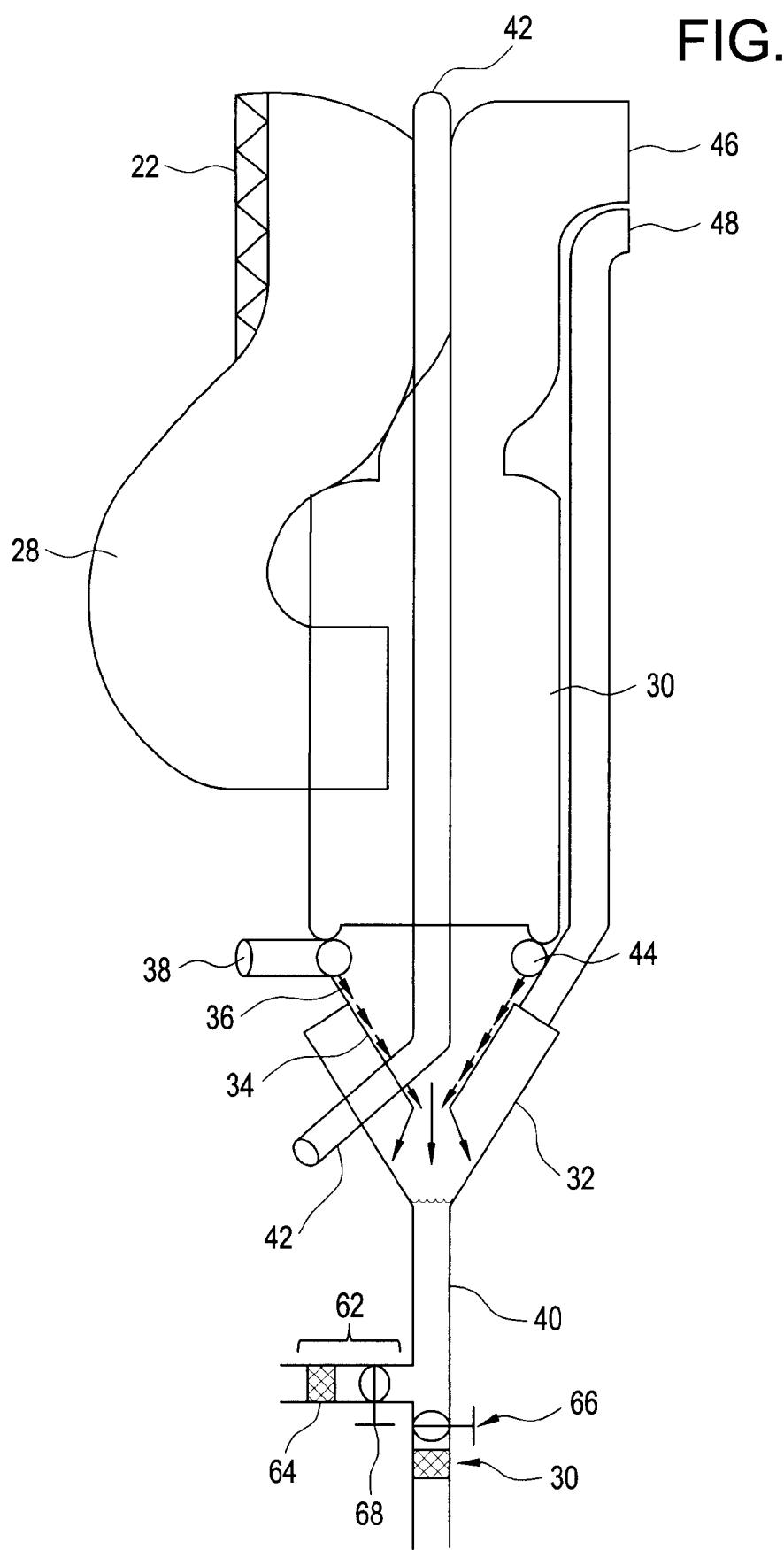
FIG. 7 is a schematic cross-sectional view of an embodiment of the invention for collecting particles from an exhaust stream.

An embodiment of the invention relates to a system for monitoring a gas turbine engine. The embodiment permits assessing conditions of the gas turbine coatings and substrates on-line. FIG. 6 is a perspective view of a turbine engine collection device 20 for collecting indicators from an exhaust stream of a turbine engine and FIG. 7 is a schematic cross-sectional view of the device 20 of FIG. 6. These figures depict a single tube 22 that has multiple open ends 24 that face directly into the exhaust gas stream indicated generally by 26. The tube 22 collects a small percentage sample of the exhaust stream 26 and delivers its exhaust sample via duct 28 to a separator 30 such as a cyclone separator. The separator 30 concentrates the particulate matter while the sampled exhaust stream 26 cools. The concentrated output of separator 30 is directed to a water-gas separator 32 that comprises a cone-shaped surface 34 (shown in FIG. 7). A stream of water 36 passing from a rinse water inlet 38 flows over the surface 34 to capture the concentrated particles. The stream of water 36 then flows down water outlet 40 shown at the bottom of FIG. 7. Thermocouple 42 measures the temperature of the exhaust gas stream 26. A manifold 44 can be provided to distribute water stream 36 completely around the cone-shaped surface 34 circumference. The exhaust stream 26 exits separator 30 via primary exhaust return 46 or secondary exhaust return 48. The water stream is filtered by a particle filter 50 to recover a particulate indicator-containing fraction and the stream 36 is circulated to inlet 38.

Again with reference to FIG. 7, particles separated from the exhaust stream by the separator 32 are carried by exhaust gas to a compartment 62, which is lined with compartment filter 64 and is connected to the separator 32 for periodic retrieval and analysis. For example, closing valve 66 and opening valve 68 causes indicator-containing particles to be deposited in compartment 62 by way of deposition on compartment filter 64.

The collection device 20 is depicted by icon 20 in FIG. 8. As discussed generally with reference to FIGS. 6 and 7 and more specifically herein with reference to FIG. 8, tubes 22 face directly into an exhaust gas stream 26 of turbine 50. The tubes 22 are in fluid communication with separator 30. Rinse water containing exhaust particles leaves the separator 30 at outlet 40 and proceeds to particle filter 50. Pump 54 continually forces rinse water back to separator inlet 38. The filter 50 is removed and the filtered particles are subjected to elemental analysis by analyzer 56 to assay for the presence of an indicator array 58. The individual indicators of array 58 are determined. A positive indication of the presence of an indicator associated with a particular turbine part generates a wear indicator signal 60 for that part. Analysis 56 of the particulate indicator-containing fraction can be accomplished by a number of methods including plasma flame spectrometry and mass spectrometry.

The following Examples are illustrative and should not be construed as a limitation on the scope of the claims unless a limitation is specifically recited.

EXAMPLE

A pattern of 0.3 mm×0.3 mm cylindrical holes, regularly spaced at 1 cm intervals to form a grid, is drilled with a laser into a MCrAlY coating on an airfoil surface. A slurry of SFP-0010, white fluorescent particle material is prepared in distilled water. The slurry is introduced into the holes by means of a syringe. The water is evaporated by gentle heating. $Na_2O\ Al_2O_3 4SiO_3$ (100 g, m.p. 1000° C.) binder is placed in a syringe and is melted by a hot glue gun. The melted binder is introduced as small droplet particles into the holes. Excess binder material is removed by attrition with fine emory paper so that the wells are flush with the airfoil surface.

The airfoil is then re-introduced into service. When a surface temperature of the airfoil reaches the melting point of the binder (1832 F), the binder melts, releasing the fluorescent particle material an exhaust stream. The material is captured by the device illustrated in FIGS. 6 and 7. The material is detected and identified by plasma flame spectrometry to indicate that the location of the pattern is subjected to a local temperature of at least 1000° C.

While preferred embodiments of the invention have been described, the present invention is capable of variation and modification and therefore should not be limited to the precise details of the Examples. The invention includes changes and alterations that fall within the purview of the following claims.

What is claimed is:

1. A method for forming a monitoring deposit on a substrate, comprising:
    determining a temperature range in which the substrate is subjected to a high temperature of operation up to less than a critical substrate deterioration temperature;
    selecting a binder to monitor temperature by emitting an indicator within the determined temperature range;
    combining the indicator and the binder;
    applying the combined indicator and binder to the substrate to form the monitoring deposit; and
    collecting the indicator released from the binder into an exhaust gas stream which passed over the substrate to provide a particulate containing fraction.

2. The method of claim 1, comprising collecting the indicator from an exhaust gas stream which passed over the substrate to provide a particulate containing fraction and analyzing the particulate containing fraction for the indicator.

3. The method of claim 1, comprising collecting the indicator from an exhaust gas stream which passed over the substrate to provide a particulate containing fraction and analyzing the particulate containing fraction for the indicator to determine wear or damage to the part.

4. The method of claim 1, comprising collecting the indicator from an exhaust gas stream which passed over the substrate to provide a particulate containing fraction; concentrating particles in the particulate containing fraction; and analyzing the particulate containing fraction.

5. The method of claim 1, comprising collecting the indicator from an exhaust gas stream which passed over the part to provide a particulate containing fraction; concentrating particles in the particulate containing fraction; and analyzing the particulate containing fraction for the indicator to determine wear or damage to the part.

6. The method of claim 1, comprising selecting a eutectic composition as the binder.

7. The method of claim 1, comprising forming a pattern of wells in a surface of the substrate, and applying the indicator and binder by placing indicator into at least one of the wells and sealing the well with binder to form the monitoring deposit.

8. The method of claim 1, comprising applying the combined indicator and binder at a first selected location on the substrate to form a monitoring deposit at a first location and applying a different binder or different indicator at a second selected location to form a separate monitoring deposit on the substrate to permit simultaneous monitoring of both the first location and second location.

9. A method of monitoring a gas turbine system, comprising:
    selecting a binder to monitor temperature by emitting an indicator within a temperature range determined to permit subjecting a substrate in the system to high temperature operation up to less than a critical turbine substrate deterioration temperature
    combining the indicator and the binder;
    applying the combined indicator and binder to the substrate to form the monitoring deposit;
    wherein the binder releases the indicator into an exhaust gas stream, when the system operating temperature reaches a melting point of the binder.

10. The method of claim 9, additionally comprising collecting the indicator from an exhaust gas stream which passed over the turbine substrate part to provide a particulate containing fraction.

11. The method of claim 9, additionally comprising collecting the indicator from an exhaust gas stream which passed over the turbine substrate part to provide a particulate containing fraction and analyzing the particulate containing fraction for the indicator.

12. The method of claim 9, additionally comprising collecting the indicator from an exhaust gas stream which passed over the turbine substrate part to provide a particulate containing fraction and analyzing the particulate containing fraction for the indicator to determine wear or damage to the gas turbine part.

13. The method of claim 9, additionally comprising collecting the indicator from an exhaust gas stream which passed over the turbine substrate part to provide a particulate containing fraction; concentrating particles in the particulate containing fraction; and analyzing the particulate containing fraction.

14. The method of claim 9, additionally comprising collecting the indicator from an exhaust gas stream which passed over the turbine substrate part to provide a particulate containing fraction; concentrating particles in the particulate containing fraction; and analyzing the particulate containing fraction for the indicator to determine wear or damage to the gas turbine part.

15. The method of claim 9, wherein the substrate is a gas turbine part selected from the group consisting of a combustor, transition piece and airfoil.

16. The method of claim 9, wherein the substrate comprises a thermal barrier coating (TBC).

17. The method of claim 9, comprising selecting a eutectic composition as the binder.

18. The method of claim 9, comprising applying a plurality of combined indicators and binders to a plurality of part substrates.

19. The method of claim 9, comprising selecting a plurality of binders for application to a plurality of part substrates, each binder selected according to a temperature range determined to permit subjecting the respective part substrate on which the binder is applied to a high temperature operation up to less than a critical substrate deterioration temperature for the respective part substrate.

20. The method of claim 9, additionally comprising selecting a plurality of indicators for application to a plurality of part substrates, each indicator selected to be different from each other indicator.

21. The method of claim 9, comprising forming a pattern of wells in a surface of the substrate, placing-indicator into at-least one of the wells and sealing the well with binder to form the monitoring deposit.

22. The method of claim 9, comprising applying the combined indicator and binder at a first selected location on the substrate to form a monitoring deposit at a first location and applying a different binder or different indicator at a second selected location to form a separate monitoring deposit on the substrate to permit simultaneous monitoring of both the first location and second location.

* * * * *